United States Patent
Laih et al.

[11] Patent Number: 6,144,740
[45] Date of Patent: Nov. 7, 2000

[54] METHOD FOR DESIGNING PUBLIC KEY CRYPTOSYSTEMS AGAINST FAULT-BASED ATTACKS WITH AN IMPLEMENTATION

[75] Inventors: Chi-Sung Laih, Yungkang; Fu-Kuan Tu, Fengshan; Yung-Chen Lee, Yunlin Hsien, all of Taiwan

[73] Assignees: Network Security Technology Co., Taipei; Lan-Ying Chiang, Tainan Hsien, both of Taiwan

[21] Appl. No.: 09/081,271

[22] Filed: May 20, 1998

[51] Int. Cl.[7] .............................. H04K 1/00; G06F 11/00; H03M 13/00
[52] U.S. Cl. .............................. 380/2; 714/746; 714/758; 714/800; 714/752; 713/172; 713/174
[58] Field of Search .................... 380/1, 30, 2; 708/491, 708/492; 713/172, 174; 714/746, 758, 800, 752

[56] References Cited

U.S. PATENT DOCUMENTS

| | | | |
|---|---|---|---|
| 4,633,036 | 12/1986 | Hellman et al. | 380/30 |
| 5,073,870 | 12/1991 | Morita | 708/491 |
| 5,144,574 | 9/1992 | Morita | 708/491 |
| 5,261,001 | 11/1993 | Dariel et al. | 380/30 |
| 5,263,085 | 11/1993 | Shamir | 380/30 |
| 5,504,817 | 4/1996 | Shamir | 380/30 |
| 5,663,896 | 9/1997 | Aucsmith | 713/201 |
| 5,712,800 | 1/1998 | Aucsmith | 713/201 |
| 5,915,024 | 6/1999 | Kitaori et al. | 713/761 |
| 5,991,415 | 11/1999 | Shamir | 380/30 |

OTHER PUBLICATIONS

Kocher, Timing Attack on Implementations of Diffie–Hellmann, RSA, DSS, and Other Systems, Cryptography Research Inc.

D. Boneh, et al., "On the Importance of Checking Cryptographic Protocols for Faults", *ENCRYPT '97*, pp. 37–51.

F. Bao, et al., "Breaking Public Key Cryptosystems on Tamper Resistant Devices in the Presence of Transient Faults", 1997 Security Protocols Workshop, Apr. 1997, pp. 1–10.

Y. Lee, et al., Efficient Checking Computations on the Evaluation on Modular Multiplications and Their Applications on Cryptography, Submitted to I.E.E.E. Transactions on Computers, 1997, pp. 1–19 and Abstract.

*Primary Examiner*—Tod R. Swann
*Assistant Examiner*—Ronald F. Sulpizio, Jr.
*Attorney, Agent, or Firm*—Rosenberg, Klein & Lee

[57] ABSTRACT

Disclosed is a method for designing public key cryptosystems against fault-based attacks in which secret information stored in a tamperfree device is revealed during the encryption/decryption or signature generation processes due to fault-based attacks. A new fault-resistant system which enables any fault existing in modular multiplications and exponential computations to be detected with a very high probability based on a coding approach. This method can be used to implement all cryptosystems whose basic operations are modular multiplications for resisting both memory and computational fault-based attacks with a very low computational overhead.

12 Claims, 1 Drawing Sheet

METHOD FOR DESIGNING PUBLIC KEY CRYPTOSYSTEMS AGAINST FAULT-BASED ATTACKS WITH AN IMPLEMENTATION

BACKGROUND OF THE INVENTION

1. The Field of the Invention

The present invention relates to public key cryptosystems, and more particularly to a method for designing public key cryptosystems against fault-based attacks since protection of the secret information stored in a tamperproof device is very important to an electronic cash system. A new fault-resistant method and system for countering information leakage to resist both the memory and computational fault-based attacks has been developed. The fault-resistant system can be readily implemented in public key cryptosystems and will achieve a high performance in computation.

2. Description of the Related Art

A smart card, which involves public-key or secret-key cryptosystems in a tamperproof device to ensure the security, is held as an important invention to provide people with a more convenient life style. The security of the public-key based smart card systems depends on the supposed difficulty of a factorization or discrete logarithm problem. For a tamperfree device, however, the secret information stored in a memory or register may induce random transient faults due to the attacks by applying stress, electromagnetic waves, ionization, etc. The transient faults can be further divided into memory faults and computational faults, and those attacks, which are called memory and computational fault-based attacks, break various public-key cryptosystems by taking the advantage of random hardware faults, and so endanger many network security products and systems.

A memory fault denotes an original information bit stored in the memory or register spontaneously changed from 1 to 0, or vice versa. In this case, there is no additional information obtained from the error to attack the cryptosystem. This is because the system now behaves like the one with a different secret key.

Furthermore, some secret information may be revealed by using the faulty output if the stored secret key is correct but is randomly caused to become faulty when it was fetched from the memory. However, if the information is verified successfully after it is fetched from the memory, the memory fault attack can be prevented.

A computational fault indicates that a fault is generated during a cryptographic computation. Since a processor must access the memory and perform the cryptographic computation frequently, the computational fault may occur with a higher probability than the memory fault.

One computational fault-based attack on an RSA public-key cryptosystem is described as follows. Let N=pq and e·d=1 (mod ¥(N)), where p and q are large primes, (e,N) and d are public and secret keys, respectively; and ¥(·) is the Euler totient function. For an RSA digital signature s=$m^d$ (mod N), $s_p$=$m^d$ (mod p) and $s_q$=$m^d$ (mod q) are first computed and the signature s is subsequently obtained by using the Chinese Remainder Theory (CRT), that is, s=crt (N,p,q,$s_p$,$s_q$).

However, the result of the cryptographic computation may be erroneous due to the computational fault. Let $s_p$' be a faulty partial signature, and $s_q$ be an error-free one, then a faulty signature is s'=crt(N,p,q,$s_p$',$s_q$). If an attacker obtains a message m and the faulty signature s', a prime q can be successfully obtained by computing q=GCD((s')$^e$−m,N), where GCD denotes the greatest common divisor. Thus, the RSA cryptosystem will be completely broken by using one computational fault only.

Conventional countermeasures such as recomputations and verifications, or random padding, etc. are used to resist the fault-based attacks. However, those conventional methods still have some disadvantages with respect to computational complexity.

In order to detect faults in a tamperproof device during the cryptographic computation, it is necessary to develop an efficient computation system with an error-checking ability. On public-key cryptosystems, a structure of a fault-resistant system (FRS) which is a public system being capable to detect any fault existing in modular multiplication with very high probability as well as a concrete implementation of the FRS for the RSA system are set forth as follows. This fault-resistant RSA system can also resist the memory fault-based attacks and can be readily applied to other public-key cryptosystems with the same algebraic structure.

SUMMARY OF THE INVENTION

The present invention is directed to a method for designing public key cryptosystems against fault-based attacks.

An objective of the present invention is to provide a method for designing public key cryptosystems against fault-based attacks with an implementation.

In accordance with one aspect of the invention, there is provided a method for designing public key cryptosystems against fault-based attacks, which comprises steps of: mapping a message from a ring to an extended ring by applying a mathematical equation of f(a)=aRR* (mod NR) to generate a codeword; checking the codeword by performing a generalized fast Chinese Remainder Theory (CRT) computation; and mapping the final result in the extended ring into a message in the ring.

In accordance with another aspect of the invention, there is provided a hardware structure for implementing a method for designing public key cryptosystems against fault-based attacks, which comprises a plurality of encoders for encoding input messages into codewords, a plurality of error-checking components for respectively performing error-checking operations to check the respective codewords generated by the respective encoders, a multiplier for performing a multiplication operation on the checked codewords respectively from the error-checking components, an error-checking element for performing an error-checking operation to check the multiplication result, and a decoder for decoding the multiplication result from the multiplier.

BRIEF DESCRIPTION OF THE DRAWINGS

The above objective, other features and advantages of the present invention will become more apparent by describing in detail the preferred embodiment thereof with reference to the attached drawings, in which.

DETAILED DESCRIPTION OF THE PREFERRED EMBODIMENT

Figure 1:
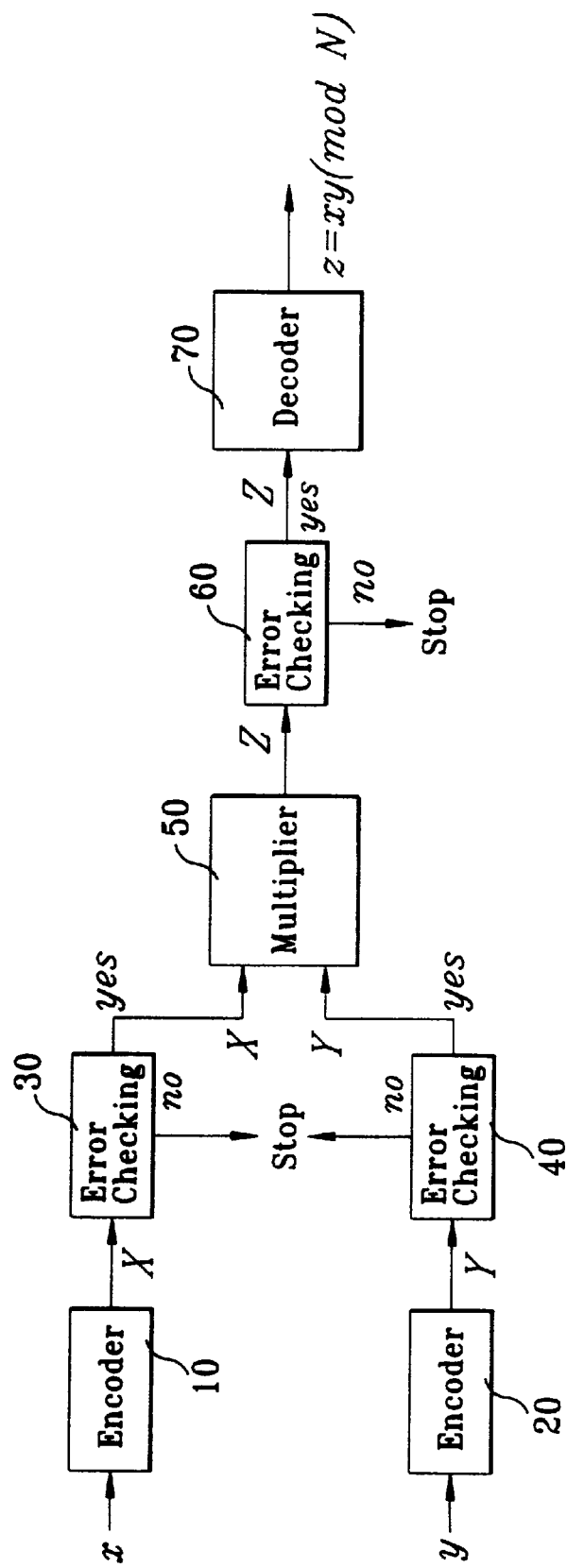
FIG. 1 shows a block diagram illustrating a hardware structure for implementing a method for designing public key cryptosystems against fault-based attacks in accordance with the present invention.

First, a mathematical structure of a fault-resistant system (FRS) is disclosed. A model of FRS is concisely explained and a formal mathematical description is subsequently discussed as follows.

1. Model of FRS

In most public key cryptosystems, though they can perform a modular multiplication operation only, their structure is actually a ring $(Z_N,+,\cdot)$, called a ring of an integer modulo N, which is a commutative ring with identity. In an RSA system, N is a composite, while in other public-key cryptosystems, N may be a large prime.

The error detecting/correcting ability of a common error detecting/correcting code is designed for errors which have occurred during a message transmission only. Since there is no operation between codewords in the error detecting/correcting code, there is no need for any operation structure in codeword spaces.

The error detecting ability of the FRS is designed to detect the errors which have occurred within the modular multiplication operation in ring $(Z_N,+,\cdot)$. To provide an ability for error detection, the distance between message words should be enlarged while they are being encoded into codewords. That is, a message space, a ring $(Z_N,+,\cdot)$ and an original structure of the public-key cryptosystem are mapped into a sufficiently large encoding space, ring $(Z_M,+,\cdot)$ with M>N, and a multiplication modulo N is converted into a multiplication modulo M.

For saving results of the multiplication operation, the mathematical structure of the codeword space, 0that is, an image of the ring $(Z_N,+,\cdot)$ contained therein, must be isomorphic to the original message space $(Z_N,+,\cdot)$ to ensure the final result is correct.

Thus, an FRS system should embed the original message space $(Z_N,+,\cdot)$ into an extended ring $(Z_M,+,\cdot)$ and then operate on the extended ring instead.

2. Mathematical Structure of FRS

A problem exists in what an encoding space $(Z_M,+,\cdot)$ is and how to find a suitable one. A complete description of $Z_M$ and an algorithm for implementing the FRS system will be given sequentially as follows.

Here, terminologies of algebra such as semigroup, group, ring, field, commutative semigroup, commutative ring, etc. are assumed to be known to those who are skilled in the art.

An element i in a ring $(R,+,\cdot)$ is said to be idempotent, if $i \cdot i = i$.

A mapping f of semigroup $(S,\cdot)$ to semigroup $(S',*)$ such that $$f(x \cdot y) = f(x) * f(y)$$

for both x and y $\in$ S, is said to be a homomorphism of S into S'. Moreover, f is called an isomorphism of S if f is injective, that is, if $f(x)=f(y)$ implies $x=y$.

A mapping between two rings is called a homomorphism if it is a homomorphism to both operations of rings respectively. A homomorphism is called an isomorphism if it is injective.

A semigroup (ring) S is said to be isomorphic to a semigroup (ring) S', denoted symbolically by $S \cong S'$, if there exists an isomorphism from S onto S'.

A ring R is said to be embedded into a ring R' if there exists a subring S' of R' such that $R \cong S'$ and the isomorphism from R onto S' is called an embedded mapping and R' is an extended ring of R.

An element a in a group G having a power of n is equal to an identity e where n>0, that is, $a^n=e$. No other positive integer power of a is smaller than n and n is called an order of a which is denoted by o(a). The order of a finite group is the number of elements in the group.

It should be noted that a group homomorphism maps the identity of one group into the identity of another group and a ring homomorphism maps the zero of one ring into the zero of another ring. However, the ring homomorphism does not always map the identity of one ring R with identity into the identity of another ring R'. In fact, if f is an embedded mapping from $Z_N$ into $Z_M$, then an image $f(Z_N)$ is an ideal of $Z_M$. An ideal of a ring with identity contains no invertible element of the ring and consequently contains no invertible element of $Z_M$, that is, the identity 1' of $Z_M$ is not contained in $f(Z_N)$ at all.

On the other hand, the $f(Z_N)$, being isomorphic to $Z_N$, itself is a ring with identity and must possess multiplicative identity of its own, which is not the same as the identity of the whole ring $Z_M$. The image f(a) of an invertible element a of $Z_N$ possesses an inverse in $f(Z_N)$ during a multiplication operation of $Z_M$ while f(a) may be not invertible in $Z_M$.

Two questions arise, which are: what is the identity of $f(Z_N)$ and how can it be mapped. The following sets out a description to $Z_M$.

Theorem 1: Let N, M be two positive integers with M>N. If f is a nontrivial isomorphism from a ring $Z_N$ into a ring $Z_M$, then
(1). N|M.
(2). $f(1)=1'$, where 1 and 1' are identities of $Z_N$ and $Z_M$ respectively.
(3). $f(1)=i$, where i is an idempotent element of order N.
(4). $f(b)=ib$, for all b in $Z_N$.

Theorem 2: $Z_N$ can be embedded into $Z_M$ if and only if
(1). N|M.
(2). There exists an idempotent element of order N in $Z_M$.

Lemma 3: Let a<M, and let $g=GCD(a,M)$ with $a=ga'$, $M=gM'$ and $GCD(a',M')=1$.

Then a is N-preserved in $Z_M$ if and only if $N \leq M'$.

Corollary 4: Let a<M, and let g, a', M' be the same as defined in Lemma 3.

Then a in $Z_M$ is an element of order N if and only if N=M'.

Theorem 5: If $GCD(R,N)=1$ and $R \cdot R^*=1 \pmod N$, then $i = R \cdot R^*$ is an idempotent element of order N both in $Z_{NR}$ and $Z_{NR}^*$.

According to Theorem 2 and Theorem 5, it is clear that a mapping defined by $f(a) = aRR^* \pmod{NR}$ from $Z_N$ into $Z_{NR}$ is an embedding and an implementation of FRS should embed the RSA space $Z_N$ into a larger space $Z_{NR}$ to provide the ability for detecting errors.

3. Implementation of FRS

Next, an implementation of the FRS is described. In the FRS, a ring $Z_N$ is embedded into an extended ring $Z_{NR}$ and then operated thereon. Except the difference in a bit length, the fault-resistant addition and multiplication operations in $Z_{NR}$ are the same as those in $Z_N$. Therefore, no special adder or multiplier is required in the FRS.

In the FRS, since message space $Z_N$ is embedded into $Z_{NR}$ and then operated therein, an encoder is needed to map a message x in $Z_N$ into a codeword X in $Z_{NR}$ by using $X=xi \pmod{NR}$, where i is defined as in Theorem 5.

First, a message x of the FRS is sent to an input terminal of the encoder where the message x is encoded into a codeword X, and then, an output of the encoder, which is the codeword X, is checked to ensure there is no error in an encoding process by examining whether $x=X \pmod N$ is hold or not.

After the original message x has been encoded into the codeword X successfully, the codeword X is stored into a memory or executed a further computational operation immediately. An error-checking operation should be performed to detect any possible computational errors whenever after one fundamental calculation (an addition or a multiplication operation) in the FRS is done. Such an operation is performed to check whether this result is still a codeword in $Z_{NR}$, that is, whether this result can be divisible by R or not.

All computational operations in the FRS are performed in $Z_{NR}$. A final result of a desired encryption/decryption should be extracted from $Z_{NR}$. Accordingly, a decoder is required to inversely map the final result Z in $Z_{NR}$ to a z in $Z_N$ by using z=Z (mod N).

FIG. 1 shows a fault-resistant multiplier. An input x of a first encoder 10 is in a ring $Z_N$ and an output thereof is in a ring $Z_{NR}$. Similarly, another input y of a second encoder 20 is also in the ring $Z_N$ and another output Y thereof is in the ring $Z_{NR}$. An encoding process is made by performing an encoding operation by using a mapping equation $X=xR\cdot R^*$ (mod NR) and $Y=yR\cdot R^*$ in the encoders 10, 20, respectively. To make sure that no error has occurred during the encoding process, the output X of the first encoder 10 is sent to a first error-checking device 30 to check whether x=X (mod N) is held or not. In a similar way, the output Y of the second encoder 20 is sent to a second error-checking device 40 to check whether y=Y (mod N) is held or not. If the conditions are held, that is, there is no error found in the error-detecting devices 30 and 40, X and Y are inputted to a modular multiplier 50 after the original messages x and y are respectively encoded into codewords X and Y, but the encoding process is stopped if there is an error found.

The modular multiplier 50 performs operations in $Z_{NR}$. An output Z of the modular multiplier 50 is sent to a third error-checking device 60 to check whether Z=XY (mod NR) is satisfied. Z will be decoded to z=Z (mod N)=xy (mod N) by a decoder 70 if the error-checking operation is successfully performed, and an alarm is generated otherwise.

4. The Fault-Resistant CRT Computation

To an ordinary Chinese Remainder Theory (CRT), a fast CRT algorithm for an RSA system has been carried out. A Fault-Resistant CRT computation is discussed as follows.

Suppose p and q are integers with GCD(p,q)=1, and p<q, then x can be figured out to satisfy the condition of $0 \leq x < p^*q$, such that x=a (mod p) and x=b (mod q). And 1. $x=(((a-(b \bmod p))\cdot u) \bmod p)\cdot q + b$ if $a \geq b$ (mod p),
2. $x=(((a+p-(b \bmod p))\cdot u) \bmod p)\cdot q + b$ if a<b (mod p), where uq=1 (mod p).

If the CRT computation is required in the FRS, since $Z_p$ and $Z_q$ are mapped to $Z_{pR}$ and $Z_{qR}$ and GCD(pR,qR)=R=1, the fast CRT algorithm described above must be modified to a general form as follows.

5. The Generalized Fast CRT Computation

Suppose p, q and R are pairwise coprime integers with p<q, x can be figured out to satisfy the condition of $0 \leq x < p^*q^*R$, such that x=a (mod pR), x=b (mod qR) with R|(a-b). Then x=crt(pqR, pR, qR, a, b), that is 1. $x=(((a-(b \bmod pR))\cdot u) \bmod p)\cdot qR + b$ if $a \geq b$ (mod pR),
2. $x=(((a+pR-(b \bmod pR))\cdot u) \bmod p)\cdot qR + b$ if a<b (mod pR), where uq=1 (mod p). Here, $(((a-(b \bmod pR))\cdot u) \bmod p)$ in case 1 is computed in ring $Z_{pR}$ as stated in section 4 and an error checking operation is made thereafter, whereafter the result is then mapped back to ring $Z_p$ so as to preserve the error detecting ability. The last portion of a multiplication by qR and an addition to b in case 1 is made in $Z_{RN}$. The computation in case 2 is similar to that in case 1.

6. The Fault-Resistant Exponential Computation

In a Fault-Resistant Exponential computation, an exponent is not encoded and the exponential computation is done by multiplying a multiplier itself iteratedly, and thus the exponent is assumed to be error-free. All the operations in the exponential computation are the same as those in an ordinary exponential computation except the difference in the length of an operand and an error checking operation which is performed after each multiplication operation is done. Therefore, the most famous method such as a square-and-multiply or sliding-windows can be applied thereto.

An integer is referred to as square-free if all of its prime divisors are not repeated. A square-free integer S has a characteristic of $S|P$ if and only if $S|P^2$ and P can be any integer. Therefore, if the parameter S is square-free, then the number of times of executing the error checking operation can be reduced when applying the square-and-multiply or sliding-windows method shown in the following algorithm. A preferable choice of the parameter S is $2^{32}-1$ which will be discussed in the next section. In fact, the probability of a large integer being square-free is about 0.61 and thus most integers are all square-free.

An efficient algorithm called Algorithm FRSEXP for a modular exponential computation using the square-and-multiply method is described as follows. Algorithm using the sliding-windows method can be done in a similar way. The Algorithm FRSEXP ensures the probability of failing to detect errors is 1/R when an error is generated during the computation.

Let a binary representation of a secret key be $d=d_{l-1} d_{l-2} \ldots d_1 d_0$ and $d_{l-1}=1$. A signature $c=m^d$ (mod NR) with d from the most significant bit (MSB) to the least significant bit (LSB) can be calculated by the aforementioned algorithm. A final result of the exponential computation can be extracted from C by c=C (mod N), if necessary. This algorithm can be easily modified to calculate the signature. Note that the algorithm can also be readily modified to compute the signature more efficiently if other fast algorithms for the exponential computation such as m-ary method and its variants are applied thereto. The modular exponential computation is shown below.

```
Function FRSEXP (M,d,N,R)
// INPUT M,d,N,R
// OUTPUT C = M^d (mod NR)
{
i := RR*;
S = iM (mod NR);
P = S;
For j = l–2 down to 0 do
{P = P^2 (mod NR);
If d_j = 1 then do {
    If R∤P then output "erroneous computation" and STOP.
        else P = PS (mod NR);
    }
};
If R∤P then output "erroneous computation" and STOP.
    else C = P (mod NR);
}
```

7. The Fault-Resistant CRT-based exponential computation

A Fault-Resistant CRT-based exponential computation by the case of RSA is shown below.

Let $R_p^*$, $R_q^*$, $R_p^{-1}$ and $R_q^{-1}$, satisfy $RR_p^*=1$ (mod p), $RR_q^*=1$ (mod q), $R_p^{-1}R_p^*=1$ (mod pR) and $R_q^{-1}R_q^*=1$ (mod qR), respectively. Let $d_p=d$ (mod p) and $d_q=d$ (mod q). The algorithm is as follows:

```
Function FRSCRT-RSA (M,d,N,p,q,R)
// INPUT M,d,N,p,q,R
// OUTPUT C = M^d (mod NR)
```

-continued

```
{
d_p = d (mod p);
d_q = d (mod q);
x_1 = FRSEXP (M,d_p,p,R); // x_1 = (RR_p*M)^dp (mod pR)
y_1 = x_1 · R_p^-1 (mod pR);
x_2 = FRSEXP (M,d_q,q,R); //x_2 = (RR_q*M)^d (mod qR);
y_2 = x_2 · R_q^-1 (mod qR);
P = crt(pqR,pR,qR,y_1,y_2);
If R∤P then output "erroneous computation" and STOP.
    else C = P (mod NR);
}
```

The CRT and exponential computations required in the above algorithm have been discussed in sections 5 and 6.

Now; a fault-detecting ability of FRS is described as follows. The fault-detecting ability of FRS can be divided into a memory fault-detecting ability and a computational fault-detecting ability.

8. Detecting Ability for Memory Faults

Let x be the secret key to be stored in a memory.

At first, x is encoded to X and then stored in the memory. Assuming that memory faults exist in the memory and a fetched secret key is X'=X+E, where E denotes the memory faults. In a decoding process, if RX', that is, X' is not divisible by R, then the memory faults can be detected. However, if X' is divisible by R, then the memory faults cannot be detected. Obviously, if X' can be viewed as a random integer in $Z_{NR}$, then the probability that the memory faults cannot be detected is 1/R. However, a detecting ability of a code is defined as a minimum Hamming distance of the code according to a coding theory. That is, if the detecting ability of the code is k, then every memory fault E whose weight w(E) is less than k can be detected. Thus, how to choose a parameter R in the FRS such that the detecting ability is maximized when a range of R is given is introduced.

Here, the following shows that if R is selected to be $R=2^k-1$ for some k, then the error detecting ability of the disclosed FRS would be k−1 bits.

Let I be a set of all positive integers and let A, B, S be positive integers of n bits, and w(A) is denoted to be the Hamming weight of A. The binary representations of A, B and S are $A=(a_{n-1},a_{n-2},\ldots,a_1,a_0)$, $B=(b_{n-1},b_{n-2},\ldots,b_1,b_0)$ and $S=(s_{n-1},s_{n-2},\ldots,s_1,s_0)$, respectively. Let $c_{-1}=0$ and let $c_i$, i=0,1, . . . ,n−1, be carries of the ith bit for the addition of A+B.

(A+B) is defined to be the total number of the carries which equal to 1 in S=A+B. That is $\#(A+B)=\#\{c_i=1|c_i=(a_i\oplus b_i)\wedge c_{i-1}\vee(a_i\wedge b_i), i=0,1,\ldots,n-1\}$ where $\oplus$, $\wedge$, $\vee$, are bitwise operations of XOR, AND and OR, respectively.

A carry-chain of length l is a sequence of l+1 carries<$c_i c_{i+1}, \ldots, c_{i+l}$>such that $c_{i-1}=c_{i+l}=0$ and $c_i=c_{i+1}=\ldots=c_{i+l-1}=1$. The $c_i$, $c_{i+l}$ are referred to as the chain-head and chain-rear respectively, while $c_j$, i<j<i+l−1, are the chain-body. A carry $c_i$ is referred to as in-chain, if $c_i$ is in some carry-chain, otherwise it is referred to as unchained.

Lemma 8: Let A, B $\in$ I $\cup$ {0}, then $w(A+B)+\#(A+B)=w(A)+w(B)$

Corollary 9: Let $E=e_t 2^{kt}+e_{t-1} 2^{k(t-1)}+\ldots+e_1 2^k+e_0$ for some k $\in$ I, t $\in$ I $\cup$ {0}, and $e_i \in$ I with $0 \leq e_i < 2^k$, i=0,1, . . . ,t. Then $$w(E) = \sum_{i=0}^{t} w(e_1) \geq w\left(\sum_{i=0}^{t} e_i\right)$$

Theorem 10: Let E be a positive integer and $R=2^k-1$, for some k $\in$ N.

If R|E, then w(E)$\geq$k.

Theorem 11: If R is chosen to be $2^k-1$, then the detecting ability for the memory fault in the disclosed FRS is k−1.

In other words, the minimum Hamming distance in the disclosed FRS is k if R is chosen to be $2^k-1$.

9. Detecting Ability for Computational Faults

Since Z=XY (mod NR)=xyRR* (mod NR), Z will be divisible by R if no error has occurred. Assuming that computational faults have occurred, let the faulty result be Z'=Z+E. If w(E)<k, then RZ' and the faults will also be detected. Hence, the system can also resist the computational fault-based attacks. The probability that an error detection has failed is 1/R. Finally, the system will output z=Z (mod N)=xy (mod N) if the error checking condition is satisfied; otherwise, the system outputs nothing but an alarm.

In the last section, the performance of the FRS and the optimal value of R are shown below.

The disclosed FRS has a low computational overhead, where the computational overhead is defined as:

$$\text{computational overhead} = \frac{O_{disc} - O_{org}}{O_{org}} \times 100\%$$

The $O_{disc}$ and $O_{org}$ denote the computational complexity in bit operations of the disclosed FRS and the original scheme without the checking ability respectively. Supposing that N and R are l and k bits in length respectively, then $O_{org}$ for the modular multiplication is $l^2$, while $O_{disc}$ is $(l+k)^2$. Hence the computational overhead for the modular multiplication is $(2kl+k^2)/l^2$. Note that the computational overhead for the modular exponentiation required in RSA (as well as in other cryptosystems) is the same as that for the modular multiplication since the length of an exponent is the same for the disclosed FRS and the original scheme. If l=1024 and k=32, which are reasonable assumptions since l=1024 satisfies a general security consideration and the detecting ability can be accepted, then the computational overhead is 6.3%. Therefore, the modular exponentiation can be computed correctly and efficiently through the FRS. For the selection of the optimal value of R, the FRS can detect up to k−1 bits of errors in E. Thus, the performance of the detecting ability will be enhanced with a large w(R). In this case, $R=2^k-1$ is a good choice for a fixed length of R.

Another advantage for $R=2^k-1$ is that the modular computations can be speeded up in this special case. Let $A=a_{t-1}2^{(t-1)k}+a_{t-2}2^{(t-2)k}+\ldots+a_1 2^k+a_0$, where $1 \leq a_i < 2^k$ for $0 \leq i \leq t-1$, and t=$\lceil l/k \rceil$, $\lceil\ \rceil$ denotes a ceiling function. Then the modular computations such as S=A(mod R) will be speeded up by $$S = \sum_{i=0}^{t-1} a_i$$

(mod R). By repeatedly performing these processes, he modular exponential operation can be executed more quickly.

With respect to the error-detecting probability, since the probability is 1/R for an error detection failure, the performance will be enhanced for a large R. However, in this situation, the computational complexity will be increased.

Therefore, the value of R is a trade-off between the error-detecting ability and the computational complexity, but it is essential to choose a special form such as $R=2^k-1$. A value of $R=2^{32}-1$ is recommended for a bit length of 1024 bits of N.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

What is claimed is:

1. A hardware structure for implementing a method for designing public key cryptosystems against fault-based attacks, comprising:
   a plurality of encoders for encoding input messages into codewords;
   a plurality of error-checking components for respectively performing error-checking operations to check the respective codewords generated by the respective encoders;
   a multiplier for performing a multiplication operation on the checked codewords respectively from the error-checking components;
   an error-checking element for performing an error-checking operation to check the multiplication result; and
   a decoder for decoding the multiplication result from the multiplier.

2. The hardware structure as claimed in claim 1, wherein said input messages are in a normal ring.

3. The hardware structure as claimed in claim 1, wherein said decoded result are in the normal ring.

4. The hardware structure as claimed in claim 1, wherein said codewords are in an extended ring.

5. The hardware structure as claimed in claim 4, wherein said error-checking operation is performed after whenever one fundamental calculation is completed to check whether the error-checking result remains in said extended ring.

6. The hardware structure as claimed in claim 5, wherein said fundamental calculation is a modular addition.

7. The hardware structure as claimed in claim 5, wherein said fundamental calculation is a modular multiplication.

8. The hardware structure as claimed in claim 5, wherein said fundamental calculation is a modular exponentiation.

9. The hardware structure as claimed in claim 5, wherein said error-checking operation is performed by a fault-resistant modular exponential computation algorithm comprising the steps of:

(1) inputting variables M,d,N and R, where d is a binary representation such as $d_{l-1}d_{l-2} \ldots d_1d_0$ and $d_{l-1}$ is equal to 1;
   (2) defining variables i, S, P and j by the following equations:
   i=RR*,
   S=iM (mod NR),
   P=S, and
   j=l-2;
   (3) defining variable P by the following equation:
   $P=P^2$ (mod NR);
   (4) determining whether P is dividable by R or not if $d_j=1$, otherwise determining if j=0;
   (5) outputting an error message if P is not dividable by R, otherwise defining said variable P by the following equation:
   P=PS (mod NR);
   (6) determining whether P is dividable by R or not if j=0, otherwise decreasing said variable j by one and repeating the steps (3) to (5);
   (7) outputting an error message if P is not dividable by R, otherwise computing a variable C by the following equation:
   C=P (mod N); and
   (8) outputting said variable C.

10. The hardware structure as claimed in claim 9, wherein said fault-resistant modular exponential computation algorithm is defined as follows:

```
Function FRSEXP (M,d,N,R)
// INPUT M,d,N,R
// OUTPUT C = M^d (mod NR)
{
i := RR*;
S = iM (mod NR);
P = S;
For j = l-1 down to 1 do
{P = P^2 (mod NR);
If d_j = 1 then do {
    If R∤P then output "erroneous computation" and STOP.
        else P = PS (mod NR);
        }
    };
    If R∤P then output "erroneous computation" and STOP.
        else C = P (mod N);
        }
```

11. The hardware structure as claimed in claim 5, wherein said error-checking operation is performed by a fault-resistant CRT-based exponential computation algorithm comprising the steps of:

(1) inputting variables M,d,N,p,q and R, where d is a binary representation such as $d_{l-1}d_{l-2} \ldots d_1d_0$ and $d_{l-1}$ is equal to 1;
   (2) computing variables $d_p$ and $d_q$ by the following equations:
   $d_p$=d (mod p), and
   $d_q$=d (mod q);
   (3) computing variables $x_1$, $y_1$, $x_2$ and $y_2$ by the following equations:
   $x_1=(RR_p*M)^{d_p}$ (mod pR),
   $y_1=x_1 \cdot R_p^{-1}$ (mod pR),
   $x_2=(RR_q*M)^{d_q}$ (mod qR), and
   $y_2=x_2 \cdot R_q^{-1}$ (mod qR);
   (4) computing variable P by the Generalized Fast CRT Computation algorithm as follows:
   P=crt(pqR,pR,qR,$y_1$,$y_2$);
   (5) outputting an error message if P is not dividable by R, otherwise computing variable C by the following equation:
   C=P (mod NR); and
   (6) outputting said variable C.

12. The hardware structure as claimed in claim 11, wherein said fault-resistant CRT-based exponential computation algorithm is defined as follows:

```
Function FRSCRT-RSA (M,d,N,p,q,R)
// INPUT M,d,N,p,q,R
// OUTPUT C = M^d (mod NR)
{
  d_p = d (mod p);
  d_q = d (mod q);
  x_1 = FRSEXP (M,d_p,p,R); // x_1 = (RR_p*M)^{d_p} (mod pR)
  y_1 = x_1 · R_p^{-1} (mod pR);
  x_2 = FRSEXP (M,d_q,q,R); //x_2 = (RR_q*M)^d (mod qR);
  y_2 = x_2 · R_q^{-1} (mod qR);
  P = crt(pqR,pR,qR,y_1,y_2);
  If R∤P then output "erroneous computation" and STOP.
     else C = P (mod NR);
}
```

* * * * *